US009866645B2

(12) United States Patent
Sharda

(10) Patent No.: US 9,866,645 B2
(45) Date of Patent: Jan. 9, 2018

(54) ACTIONABLE NOTIFICATIONS APPARATUSES, METHODS AND SYSTEMS

(71) Applicant: VISA INTERNATIONAL SERVICE ASSOCIATION, San Francisco, CA (US)

(72) Inventor: Dhiraj Sharda, Fremont, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 511 days.

(21) Appl. No.: 14/484,855

(22) Filed: Sep. 12, 2014

(65) Prior Publication Data

US 2015/0082212 A1    Mar. 19, 2015

Related U.S. Application Data

(60) Provisional application No. 61/877,901, filed on Sep. 13, 2013.

(51) Int. Cl.
*G06F 3/048* (2013.01)
*H04L 29/08* (2006.01)

(52) U.S. Cl.
CPC ............ *H04L 67/26* (2013.01); *H04L 67/306* (2013.01); *H04L 67/36* (2013.01)

(58) Field of Classification Search
CPC .............................. H04L 67/26; G06F 3/04847
See application file for complete search history.

(56) References Cited

U.S. PATENT DOCUMENTS

| 9,424,603 B2* | 8/2016 | Hammad | G06Q 30/0639 |
| 9,449,327 B2* | 9/2016 | Carlson | G06Q 30/02 |
| 2004/0061716 A1* | 4/2004 | Cheung | G06F 9/542 |
| | | | 715/710 |
| 2004/0225718 A1* | 11/2004 | Heinzel | G06Q 10/107 |
| | | | 709/206 |
| 2007/0265963 A1* | 11/2007 | Allin | G06Q 10/00 |
| | | | 705/40 |
| 2010/0312630 A1* | 12/2010 | Krutchik | G06Q 30/02 |
| | | | 705/14.35 |

(Continued)

*Primary Examiner* — Rashawn Tillery
(74) *Attorney, Agent, or Firm* — Loeb & Loeb LLP

(57) ABSTRACT

The ACTIONABLE NOTIFICATIONS APPARATUSES, METHODS AND SYSTEMS ("ACNO") transforms inputs such as actionable notification enrollment input, action input, and trigger messages via ACNO components into actionable notification message output. In one embodiment, the disclosure describes a processor-implemented actionable notification method, which comprises, receiving an actionable notification enrollment request with a device identification, and criteria for receiving actionable notifications, and receiving an actionable notification trigger message. The method further comprises determining an actionable notification message based on the actionable notification trigger message and the criteria for receiving actionable notifications, and determining actionable notification associated actions. The method further comprises transmitting the actionable notification message and the associated actions, and receiving an action selection from the associated actions, and effecting the action selection.

54 Claims, 8 Drawing Sheets

(56) References Cited

U.S. PATENT DOCUMENTS

| | | | | |
|---|---|---|---|---|
| 2011/0029360 A1* | 2/2011 | Gollapalli | G06Q 30/02 | 705/14.1 |
| 2012/0089461 A1* | 4/2012 | Greenspan | G06Q 20/12 | 705/14.58 |
| 2012/0215611 A1* | 8/2012 | Korson | G06Q 30/0222 | 705/14.23 |
| 2012/0323664 A1* | 12/2012 | Klems | G06Q 30/02 | 705/14.26 |
| 2013/0262203 A1* | 10/2013 | Frederick | G06Q 30/0209 | 705/14.12 |
| 2013/0275190 A1* | 10/2013 | Rossi | G06Q 30/02 | 705/14.4 |
| 2013/0304559 A1* | 11/2013 | Stone | G06Q 20/06 | 705/14.33 |
| 2014/0067901 A1* | 3/2014 | Shaw | G06Q 10/10 | 709/201 |
| 2014/0074704 A1* | 3/2014 | White | G06Q 20/353 | 705/41 |
| 2014/0195327 A1* | 7/2014 | Poskrobko | G06Q 30/0267 | 705/14.39 |
| 2014/0280516 A1* | 9/2014 | Flowers | G06F 17/30241 | 709/203 |
| 2015/0081534 A1* | 3/2015 | Zamer | G06Q 20/227 | 705/40 |
| 2015/0120849 A1* | 4/2015 | Thies | H04W 72/0493 | 709/206 |
| 2015/0169137 A1* | 6/2015 | Pollock | G06Q 10/10 | 715/808 |

\* cited by examiner

101
$10 off $50 at Fancy store
[Save to passbook] [Next deal]

105
10% off when using your VISA card
[Shop at Amazon] [Save to couponbook]

110
Rain today. Bring umbrella.
[Snooze 1 hour] [Dismiss]

115
Meeting with realtor at 4pm
[Reschedule] [Directions] [Snooze]

120
Famous pizza near you
[Menu] [Directions] [Show me Sushi]

125
Email from Joe Smith
[Respond] [Delete]

130
Your Visa Gold is getting $300 charged from BestBuy
[Send Notice] [Allow GPS verification]

- Rule 1  162
- Rule 2  164
- + Add more rules  166

155

Rule 1

Bank over-draft notice _____ $200 _____  172

168

170
- Less than
- Greater than ▽
- Equal to

174
- ☑ Send notice
- ☑ Allow pin verification
- ☐ Allow photo verification
- ☐ Allow GPS verification + Add   176     - Delete   178

160

Rule 2

Your Visa Gold is getting a $ _____ charge from _____ $100 _____   184

180

182
- Less than
- Greater than ▽
- Equal to

186
- ☑ Send notice
- ☐ Allow pin verification
- ☐ Allow photo verification
- ☑ Allow GPS verification + Add   188     - Delete   190

ACTIONABLE NOTIFICATIONS APPARATUSES, METHODS AND SYSTEMS

PRIORITY CLAIM

This application claims the benefit of U.S. Provisional Application No. 61/877,901, filed Sep. 13, 2013, entitled "ACTIONABLE NOTIFICATIONS APPARATUSES, METHODS AND SYSTEMS." The entire content of the aforementioned application is expressly incorporated by reference herein.

This application for letters patent discloses and describes inventive aspects directed at various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

The present innovations are directed generally to computer science and electronic notification management, and more particularly, to ACTIONABLE NOTIFICATIONS APPARATUSES, METHODS AND SYSTEMS.

BACKGROUND

Push notifications are commonly used by mobile phone apps to notify subscribers of events that may be of interest to the subscribers. For example, an email app may notify a subscriber of incoming email, a gaming app may notify a subscriber that it is his turn to act, a deal app may notify subscribers of a sales event at a particular store, etc. However, once a conventional push notification has served its primary function of notifying a subscriber of an event, it provides very limited options for the subscriber to react to the notification. Specifically, the present inventor has observed that conventional push notifications, each of which has an associated app, are only capable of providing shortcuts for launching the associated apps. Thus, the present inventor has observed a need for an improved, more versatile push notification system.

BRIEF DESCRIPTION OF THE DRAWINGS

The accompanying appendices and/or drawings illustrate various non-limiting examples of innovative aspects in accordance with the present descriptions:

FIGS. 1A-1B show block diagrams illustrating example embodiments of the actionable notification system;

Figure 2:
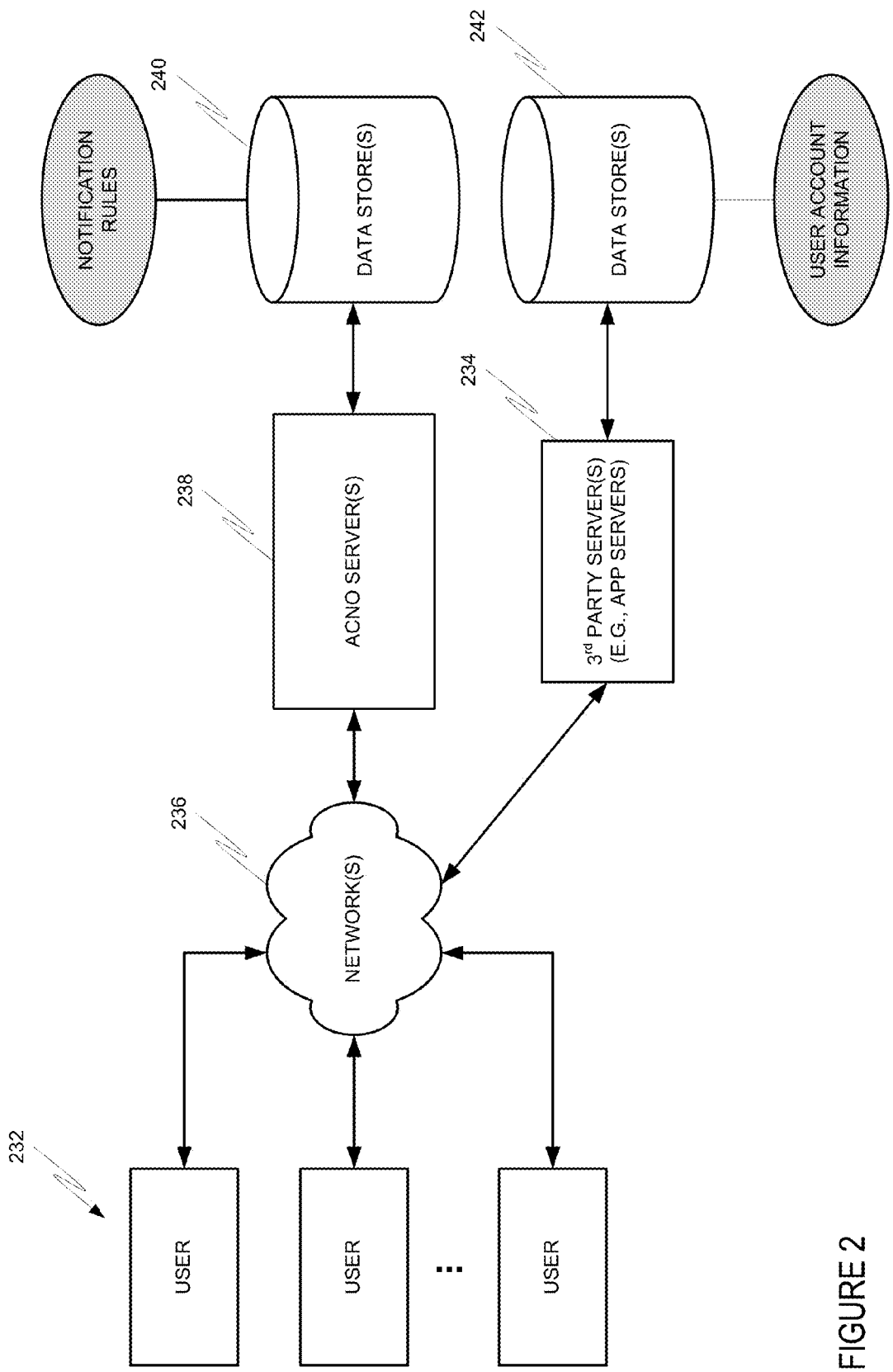
FIG. 2 shows a block diagram of exemplary network architecture for the actionable notification system.

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION

In one embodiment, the actionable notification (hereinafter "ACNO") may allow you to tap into the push notification functionality and add action buttons that let the user do more than the re-direct to the application. For example, if there is a push notification for a deal/coupon from a merchant, there could be a button within the push notification that would allow the user to save the deal in their digital wallet directly from the notification.

ACNO

FIGS. 1A-1B show block diagrams illustrating example embodiments of the ACNO. FIG. 1A shows example actionable notifications a user may receive on their electronic devices (e.g., computer, mobile phone, tablet device, etc.) For example, the user may receive push notifications triggered by $3^{rd}$ party advertisers. For instance, the user may receive a push notification including a coupon for "$10 off $50 at Fancy store" 101. Within the notification user interface (e.g., a pop-up message), the user may choose to either "Save to passbook," which may cause the coupon to be saved in the user's iOS passbook, at a local storage location controlled by the ACNO client (if the ACNO is a background app service running on the user's device), on an ACNO server, and/or the like. Alternatively, the user may choose to see the "Next deal," which may cause the ACNO server to send the next deal notification (if any). As another example, an actionable notification may be "10% off when using your VISA card" 105. If the user selects "Shop at Amazon," the user may be shown Amazon.com, Inc.'s virtual storefront, such as the Amazon app or Amazon's web site. If the user instead selects "Save to couponbook," the coupon notification message may be saved in the user's couponbook on a remote server, such as the ACNO server or a third party server, or on a local storage device.

A notification may also be triggered by the user's environment. For example, the user's device may periodically transmit its location (e.g., as determined by the device's GPS, WiFi, or other location detection technology) to the ACNO server, which may look up the weather report for the associated region (e.g., via weather.com or other weather reporting services) and send a weather-appropriate push notification 110 to the user (e.g., "Rain today. Bring umbrella"). The user may choose to snooze the notification for an hour (e.g., the ACNO server may be notified of the snooze selection and send another push notification after an hour, or a local calendaring app would be notified and cause a new notification to be displayed in an hour). Alternatively, the user may simply dismiss the notification, in which case no additional action is performed. In another embodiment, the ACNO server may store or have access to the user's calendar entries and send push notifications to the user at the appropriate times (e.g., the user's device may periodically notify the ACNO server of the local time zone). For example, an actionable notification may be "Meeting with realtor at 4 pm" 115. In response, the user may choose to "Reschedule" the appointment, in which case a local app on the user's device may launch and reschedule the appointment, or a reschedule request may be sent to the remote server hosting the user's calendar entries. The user may alternatively select "Directions" to cause a local navigation app to launch and show directions to the meeting location (e.g., the address may be provided as part of the push notification data payload or the user's device may retrieve the location from the calendar source). A third exemplary action option is to snooze the notification, similar to the "Snooze 1 hour" example discussed in the previous example. In another example, the ACNO server may send an actionable notification 120, such as "Famous pizza near you," to the user based on the location information received from the user's device. The user may respond by choosing to see the "Menu" of the restaurant. In one implementation, a URL of the menu may be transmitted along with the actionable notification and displayed in a web browser on the user's device. The actionable notification may also include the address of the restaurant, which may be used when the user selects "Directions" to cause a local navigation app or an Internet-based mapping service (e.g., Google Map, MapQuest, etc.) to display directions to the restaurant. If the user is disinterested in the shown restaurant, he may select, e.g., "Show me Sushi" to cause the ACNO server to send another actionable notification showing the nearest sushi restaurant.

There exist many other exemplary use-cases for actionable notifications as well. For example, an email push notification (e.g., "Email from Joe Smith" 125) may include actionable options such as "Respond" and "Delete." By selecting "Respond," an email app may be launched and the user may be taken directly to the response flow (e.g., the user may immediately begin to compose his response after the app has launched). If the user selects "Delete," a delete request may be sent to (1) the user's local email app, (2) the user's email server directly, or (3) the ACNO server, which in turn may send a delete request to the user's email server. For another example, a credit card issuer may cause an actionable notification to be sent to a user, informing him: "Your Visa Gold card is getting $300 charged from Best-Buy" 130. In response, the user may select "Send Notice" to cause the ACNO server to send a transaction notice to the user. The user may also select "Allow GPS verification," which is described in more detail in FIG. 3.

In certain exemplary use-cases, the user may set up notification rules on the ACNO server. FIG. 1B shows exemplary user interfaces for setting up notification and actionable preferences for different types of financial transaction events. In one embodiment, a user may set up preferences and/or rules for receiving notifications, such as what notifications to accept and what actionable options to enable for each type of notification. For example, the user interface may include a panel where the user may define the rules 150. When the user clicks on Rule 1 (e.g., 162), a separate panel may show the details of Rule 1 (e.g., 155). When the user clicks on Rule 2 (e.g., 164), a panel for Rule 2 (e.g., 160) may similarly be shown. The user may add more rules 166, or delete existing rules. The ACNO server may send push notifications based on the rules defined by the user.

For example, Rule 1 may define the circumstances for sending a bank over-draft notice 168 (the message itself may be customizable) and the accompanying actionable options. For this notification, the user may define an upper and/or lower limit that would trigger an over-draft notification to be sent. For example, the user may want to receive a notification when an over-draft is less than, greater than, or equal to (e.g., 170) a dollar amount (e.g., 172). In one implementation, the user may input the dollar amount manually or choose from a drop down box. In addition, the user may specify the actions to be taken when an over-draft satisfying the defined rule occurs. For example, the user may check one or more of the available actionable option check boxes 174 relevant to the rule. As shown in the figure for Rule 1, the user has checked "Send notice," which means that the ACNO server is instructed to send a notification to the user's device when Rule 1 satisfied (e.g., the over-draft amount is less than $200). In addition, the notification may include actionable verification options, such as PIN verification, photo verification, or GPS verification. Since the user in this example has selected "Allow pin verification," any over-draft notification sent to the user would include an actionable option for the user to verify an over-draft transaction by entering a PIN (similarly, if "Allow photo verification" or "Allow GPS verification" is selected, the user would have the option to verify via photo, such as face-recognition or fingerprint, or GPS location, respectively). The security verification may be processed on the user's device, in which case only the result of the verification (and not the PIN, photo, or GPS location) would be sent to the ACNO server. Alternatively, the verification information (e.g., PIN, photo, GPS location) may be transmitted to and verified by the ACNO server. If the verification passes, the ACNO server would inform the financial institution that the user has consented to the over-draft; on the other hand, if the verification fails, the ACNO server would inform the financial institution that the over-draft should be denied. The user may add 176 or delete 178 any actionable option checkboxes for the associated rule.

As another example, the panel for Rule 2 (e.g., 160 in FIG. 1B) shows user-defined configurations for a notification that informs, "Your Visa Gold is getting a $$_{131313131313}$ charge from $_{131313131313}$" 180. In the depicted example, the user has indicated that when a charge to his Visa Gold card is greater than (e.g., 182) $100 (e.g., 184), a notification should be pushed to his device, as indicated by the checkbox for "Send notice" (e.g., 186) being checked. The user in this example has also selected GPS verification to authorize charges. In one embodiment, a notification sent according to this rule would include an actionable option for the user to authorize a charge using his device's GPS location (e.g., similar to the example shown in 130 of FIG. 1A). By selecting the actionable option displayed with the notification, the user's device may send its GPS location to the ACNO server, which in turn may determine whether the GPS location substantially coincides with the location where the charge is being made. For example, if the charge is coming from a particular BestBuy store, the ACNO server would determine whether the received GPS location of the user's device substantially coincides with the location of the BestBuy store. If the locations coincide, then the ACNO server would inform the issuer of the credit card that the charge is authorized; if the locations do not coincide, the ACNO server may notify the issuer that the charge is not authorized. Alternatively, the user may also allow PIN verification or photo verification to authorize the charge. The user may also add 188 or delete 190 any criteria or actionable options in the rule.

In some implementations, the ACNO server may receive data payloads from third party servers and compare the data payloads with the user's rules to determine whether push notifications should be sent. A data payload, for example, may be a bank over-draft amount from the user's bank. In some implementations, the ACNO may publish a notification platform, a communication protocol, API, and/or the like, that a third party system (e.g., the user's bank) can implement to send trigger messages, which may include data payloads, to the ACNO server. For example, when a user installs a banking app onto his device, an associated banking server may be informed that push notifications triggers should be sent to the ACNO server. Those triggers may then be processed against the user's rules in order to determine whether a push notification should be sent to the user. For example, while the bank may send all bank overdraft notices to the ACNO server regardless of the amount, the user may only wish to be notified of those that are above a certain amount. The user may create a rule with the ACNO server to filter out the unwanted notifications.

FIG. 2 shows a block diagram of an exemplary network architecture utilizing the ACNO system. Users 232, the ACNO server(s) 238, and $3^{rd}$ party server(s) 234 are communicatively connected via a network(s) 236, such as the Internet. The ACNO server 238 may have access to a data store(s) 240, where notification rules and other information for sending actionable notifications may be stored. The $3^{rd}$ party server(s) 234 may also have access to a data store(s) 242 for storing user account information, which may include the address of the ACNO server servicing the user's push notification service.

User devices may be configured to handle push notifications from the ACNO server in a variety of ways. In some implementations, a user's operating system may have a push notification handler that listens to and processes incoming push notifications from the ACNO server. For example, Apple's iOS and Google's Android platforms may implement their notification handlers and notification servers to support actionable push notifications as described herein. In some other implementations, an ACNO notification handler may be installed on a user's device and be set to replace the operating system's notification handler as the device's default notification handler. In some implementations, a third party ACNO-compliant notification handler layer (i.e., an added layer of abstraction on top of an existing notification handler to support ACNO features) may be added to an operating system's default notification handler. For example, a device manufacturer (e.g., Samsung) and/or service carrier (e.g., Verizon or AT&T) may implement and install an ACNO-compliant notification handler layer on its devices, leveraging the underlying operating system's default notification handler. When a user installs an app or specifies a desire to receive push notifications from a particular source, a server associated with the source may be automatically informed that the default ACNO notification system is to be used. With that knowledge, the source may format its trigger messages and/or data payload to conform to the requirements of the ACNO server, and transmit the trigger messages and/or data payload to the ACNO server. In some other implementations, an additional ACNO notification handler may run concurrently with an operating system's default notification handler. The ACNO notification handler may listen for and handle ACNO push notifications, and the operating system's default notification handler may continue to listen for and handle the traditional type of push notifications. When the user's device informs a notification source of the type of notification handler that should be used, the user's device may prompt the user to select the operating system's default notification handler, the ACNO notification handler, or both. The notification source may format and send its trigger messages according to the user's selection. For example, if the operating system's default notification handler is selected, the notification source may send notification messages to the corresponding notification server according to that server's requirements. On the other hand, if the ACNo notification handler is selected, then the notification source may send notification messages to the ACNO server according to the ACNO server requirements. If instead the user selected both the operating system notification handler and the ACNO notification handler, then in some implementations the notification source may choose which system to use to transmit its messages. For example, actionable notifications may be sent via the ACNO system, and non-actionable notifications may be sent via the operating system's notification system.

Figure 3:
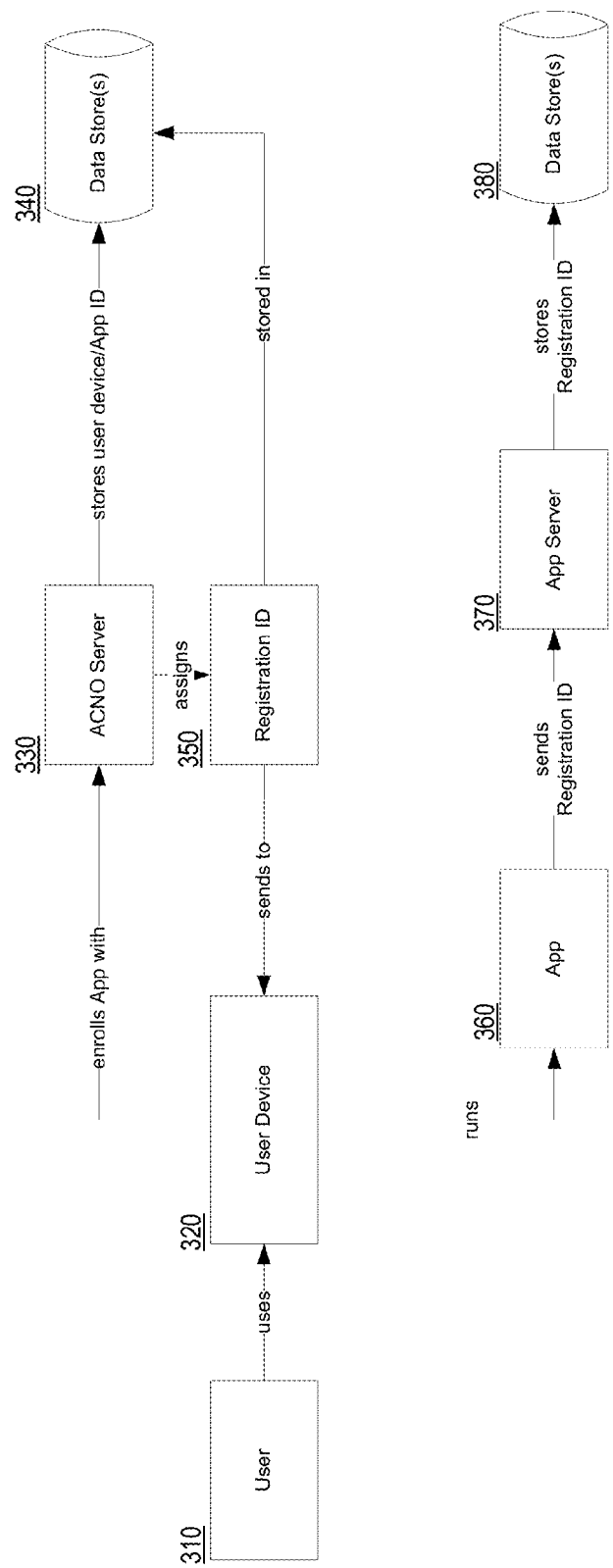
FIGS. 3-4 show exemplary aspects of the actionable notification system.

FIG. 3 shows exemplary aspects of a system utilizing the ACNO server. A user 310 uses a user device 320, which may be a computer, a mobile device such as a smart phone or tablet, etc. The user device 320 may receive push notifications from an ACNO server 330. In one implementation, the user device 320 may enroll with the ACNO server 330 to receive push notifications. The enrollment request may include information such as a user's identification (e.g., email address), device identification (e.g., MAC address), and/or the identification of an app 360 installed on the user device 320 that utilizes push notifications. In response to the enrollment request, the ACNO server 330 may generate and assign a registration identification 350. The registration identification 350 may be stored in a data store 340 and associated with user information, such as the aforementioned user identification, device identification, app identification, etc. The registration identification 350 may also be sent to the user device 320. The app 360 running on the user device 320 may cause the registration identification 350 to be sent to an app server 370 associated with the app 360. For example, the app of a credit card issuer, such as Citibank, may be associated with a Citibank server configured to provide the Citibank app with operational data/notifications. The app server 370 may store the registration identification 350 in a data store 380 and associate it with the user. When an event (e.g., a credit card charge authorization request) triggers the app server 370 to send a push notification to the user, the app server 370 may send a notification request, along with the user's registration identification, to the ACNO server, which in turn may use the registration identification to identify the associated user and push notifications to the user's device.

Figure 4:
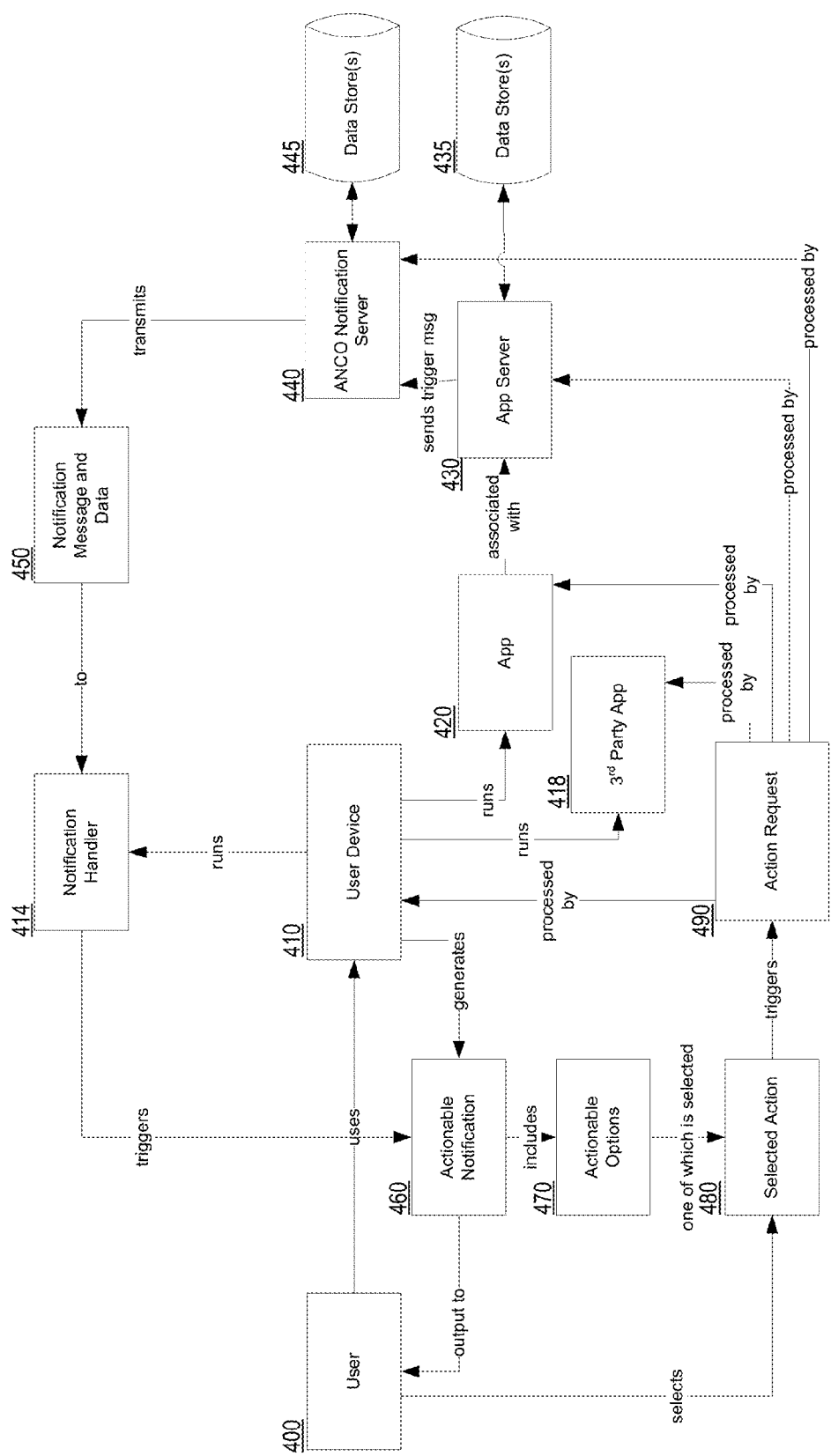

FIG. 4 shows a block diagram illustrating exemplary embodiments of features of the ACNO system. The user 400 uses a user device 410 (e.g., computer, mobile device, etc.). The mobile device 410 may run one or more apps, some of which may be third party apps, and other may be native to the device's operating system. An app 420 may be associated with an app server 430. The app server 430 has access to a data store(s) 435, which may store user information. For example, the data store 435 may store user account information associated with the user 400, and/or store a registration identification associated with the user 400 (e.g., the data store 435 may be a relational database system with a table containing pairs of user ID and registration ID). When the app server 430 wishes to push a notification to the user 400, it may, e.g., send a push notification request to an ANCO notification server 440. The notification request may include the user's associated registration identification, which the ANCO notification server 440 may use to identify the user device 410 to which a push notification should be sent. When the ANCO notification server 440 receives the push notification request, it may identify the registration identification and query data store 445 for the associated user information. The user information may include the user's account information, device address, and push notification rules, as described above. Based on any applicable push notification rules, the ACNO notification server 440 may generate a push notification message, along with any relevant data payload, and transmit it to the user device 410 associated with the registration identification stored in data store 445.

The aforementioned push notification request may take many forms. For example, it may be a request for the ACNO server 440 to send a push notification, or it may include data that the ACNO server 440 would need to process according to the user's defined notification rules in order to determine whether a push notification should be sent. For example, a Citibank app server 430 may have already determined that a push notification should unconditionally be sent to the user 400, in which case the app server 430 would send a notification request, including the desired message and the registration identification of the recipient, to the ACNO notification server 440. The app server 430 may alternatively send the ACNO notification server 440 data, such as the dollar amount pending authorization to be charged to the user's credit card, and request that the ACNO notification server 440 determine whether a push notification should be sent. In such case the ACNO notification server 440 may query data store 445 for the user-defined rules associated with the user (e.g., based on the registration identification included in the request from the app server 430), identify the applicable rule (e.g., the ACNO notification server 440 may identify the applicable rule based on app identification and request-type identification included in the request), and determine whether the criteria set forth in the identified rule are satisfied by the request's data payload (e.g., the dollar amount pending authorization). If the rule is satisfied, the ACNO notification server 440 may generate a push notification 450 according to the user's rule, which may indicate that GPS or PIN authorization options should be made available via the push notification. The push notification 450 may include a notification message and any other data relevant to the actionable options. For example, if the generated push notification allows for GPS verification, the notification 450 may also include instructions sufficient to cause the user's device 410 to transmit its GPS location back to the ACNO server upon user selection of the GPS verification actionable option.

The push notification 450 generated by the ACNO notification server 440 is received by the user device 410, and in some embodiments handled by a notification handler 414 running on the user device 410. The notification handler 414 in some implementations may be a service of the device's 410 operating system or a 3rd-party service, and may run in the background to listen for and processes push notifications (e.g., 450) from the ANCO notification server 440. Upon receiving a push notification 450, the notification handler 414 may identify the data contained therein. For example, the notification 450 may include instructions for displaying messages and actionable options, such as those shown in FIG. 1A. The notification 450 may itself include the data needed (e.g., message text strings and commands) for the user device 410 to generate the notification display, or it may instead include references to content resources (e.g., URLs or content IDs) where text strings, commands, etc. may be remotely downloaded or locally retrieved (e.g., such as from the app associated with the notification). Based on the notification 450, the notification handler 414 then causes the user device 410 to generate and display an actionable notification 460 to the user 400. The actionable notification may include actionable options 470. For example, a credit card charge notification may include authorization options; an email notification may include email deletion, response, or forwarding options; a product advertisement notification may include options to launch a virtual store front (e.g., an app or a web site) or to store the advertisement or coupon for later retrieval/consumption; a calendar notification may include options to reschedule the event or to launch an app to show directions to the event location; an app-upgrade notification may include options to perform or reject the upgrade; a WiFi availability notification may include options to connect to, for example, the top three available access points with the best reception; an instant messaging notification may include options for launching an app to read the message (e.g., via text-to-speech technology) and/or to reply to the message (e.g., via speech-to-text technology), etc. The options may be presented as buttons, text links, slide bars, checkboxes, or any conventional graphical user interface.

In one implementation, the notification handler 414 may provide the necessary system API for app developers or notification developers to invoke the various functions. For example, an API may allow notifications 450 to launch or communicate with apps stored on the user's device 410. For example, a notification 450 wishing to launch an app may specify in its payload (e.g., which may conform to pre-defined protocols) the particular API for launching apps and the particular app to be launched (which may be identified by using the aforementioned registration identification, app ID, app name, etc.). Similarly, the API may also allow parameters to be passed to the particular app, such as passing an address to a navigation app. In some implementations, the notification handler 414 may handle the actuation of the actionable options 470.

After viewing the actionable notification 460, the user 400 may select one or more of the actionable options 470. The selected action 480 may then trigger an action request 490. Depending on the entity or component whose action is needed by the action request 490, the action request 490 may be sent to and processed by different entities/components. For example, an action request 490 for changing the system default volume may be processed by the user device 410 operating system. As another example, an actionable notification 460 triggered by an app server 430 may include actionable options 470 intended to be processed by the app 420 associated with the app server 430 (e.g., Groupon's app server may send a notification for a particular deal and provide users with an actionable option to purchase the deal via the Groupon app). The actionable notification 460 may also include an actionable option 470 that requires a $3^{rd}$ party app 418 to be launched (e.g., the Groupon notification may include an actionable option to launch a navigation app to show the location of the vendor of the deal). The app 418 is referred to as "$3^{rd}$ party" because it is not directly associated with the notification (e.g., a navigation app is not associated with a Groupon notification, whereas the Groupon app is). The action request 490 may also be directed to the app server 430 that triggered the actionable notification 460 to be sent (e.g., the Groupon notification may include an actionable option to save the Groupon deal in the user's wish list, managed by the Groupon server). As another example, the action request 490 may also require action by the ACNO notification server 440 (e.g., to send the next Groupon notification).

Figure 5:
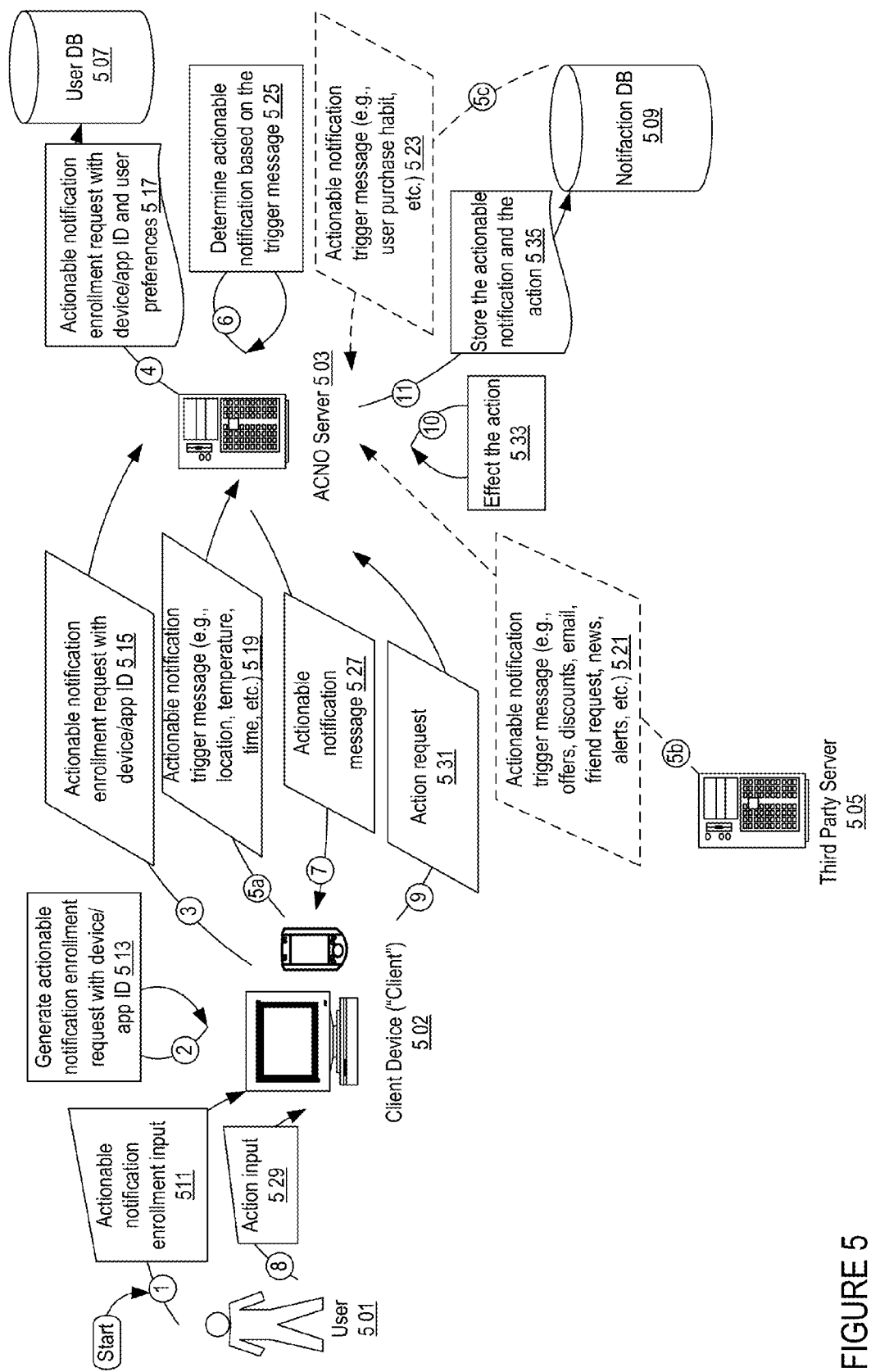
FIG. 5 shows a block diagram illustrating example data flow in some embodiments of the actionable notification system.

FIG. 5 shows a block diagram illustrating example data flow in some embodiments of the ACNO. In one embodiment, the user 501 may provide actionable notification enrollment input 511 to the Client Device 502 (e.g., computer, mobile device, etc.). In response, the Client Device 502 may generate an actionable notification enrollment request 513 with a device ID and/or an app ID associated with an app that wishes to utilize the ACNO server's 503 push notification service. In some embodiments, the user may also specify one or more rules for receiving notifications, in which case the actionable notification enrollment request 513 may also include definitions for those rules. The generated actionable notification enrollment request 513 may then be sent 515 to the ACNO Server 503. An example actionable notification enrollment request substantially in the form of a HTTP(S) POST message 515 including XML-formatted data, is provided below:

```
POST /actionablenotificationenrollmentrequest.php HTTP/1.1
Host: www.ACNO.com
Content-Type: Application/XML
Content-Length: 667
<?XML version = "1.0" encoding = "UTF-8"?>
<actionable_notification_enrollment_request>
    <timestamp>2010-05-06 05:00</timestamp>
    <device_id>Samsung Galaxy S4</device_id>
    <device_operating system>Android</device_operating_system>
    <app_id>453rp</app_id>
    <app_name>visa wallet</app_name>
    <notification_destination_unique_id>SGS4453rp</notification_
destination_unique_id>
    <notification_transmission_type>web</notification_transmission_type>
<optional>
    <User>
        <UserName> John Smith </UserName>
        <UserID>JS0000</UserID>
        <AccountNo> 0000 0000 0000 </AccountNO>
        <Password> 0000 </Password>
    ...
    </User>
    <User_preference>
        <notification_time_period>5pm-10pm</notification_time_period>
        <notification_category>Bank over draft
notice</notification_category>
        <notification_limits>less than $200</notification_limits>
        <notification_sendnotice>Y</notification_sendnotice>
    <notification_pin_verification>Y</notification_pin_verification>
    <notification_photo_verification>N</notification_photo_verification>
    <notification_GPS_verification>N</notification_GPS_verification>
    <user_preference>
</optional>
</actionable_notification_enrollment_request>
```

After receiving the request 515, the ACNO Server 503 may store 517 data contained therein in a user database 507 (e.g., a relational database system that may be local or remote to the ACNO server 503). For example, the ACNO Server 503 may store the device and/or app ID in the database 507.

After a user's device/app has been enrolled with the ACNO Server 503, the ACNO Server 503 may push notifications to the user's device/app when certain triggering events are detected. In one embodiment, the ACNO Server 503 may receive actionable notification trigger messages from multiple possible sources. For example, the Client Device 502 may send an actionable notification trigger message 519, such as location, temperature, time, and so forth to the ACNO Server 503. For example, based on received location information, the ACNO Server 503 may determine that a nearby sales event might be of interest to the user and send a notification accordingly (e.g., the ACNO Server 503 may have access to the user's purchase history and may deduce that the sales event would be of interest to the user). Actionable notification trigger messages may also be received from Third Party Servers 505 (e.g., such as an app server associated with the registered app ID), such as offers, discounts, email, friend request, news, alerts, data (e.g., pending credit card charge amount) and so forth 521 to the ACNO Server 503. An example actionable notification trigger message substantially in the form of a HTTP(S) POST message including XML-formatted data, is provided below:

```
POST /actionablenotificationtriggermessage.php HTTP/1.1
Host: www.ACNO.com
Content-Type: Application/XML
Content-Length: 667
<?XML version = "1.0" encoding = "UTF-8"?>
<actionable_notification_trigger_message>
    <timestamp>2010-05-07 05:00</timestamp>
    <notification_trigger_entity>
BankOfAmerica</notification_trigger_entity>
    <notification_trigger_category>Bank Over draft
notice</notification_trigger_category>
    <notification_message>Your bank is over drafted for
$100</notification_message>
</actionable_notification_trigger_message>
```

In another alternative embodiment, a Notification Database 509 may send actionable notification trigger messages 523, such as user purchase habits and so forth, to the ACNO Server 503. Alternatively, the ACNO Server 503 may query the Notification Database 509 for user data upon receiving a trigger message from one of the other sources (e.g., from the Client Device 502). Based on the trigger messages (e.g., 519, 521, 523) from the Notification Database 509 or any of the other sources (e.g., Client Device 502 or Third Party Server 505), the ACNO Server 503 may determine 525 the proper actionable notification to send to the Client Device 502. In some implementations, the trigger messages (e.g., 519, 521, 523) may include the device ID and/or app ID to indicate the intended recipient of the notification (alternatively, the identification may be a registration identification, as described above). Based on the identification information, the ACNO Server 503 may retrieve the associated enrollment information from the User Database 507 and determine the recipient's address. (The ACNO Server 503 may then send an actionable notification message 527 to the Client Device 502.

The actionable notification message 527 may contain data and instructions for causing the Client Device 502 to generate the intended display. In one implementation, the actionable notification message 527 may be in web form. The Client Device 502 may generate the notification message in the form of a dialogue box in the middle of the user's device or in an corner of the computer screen, or be part of a pull-down menu listing of notifications. In an alternative embodiment, the notification may be delivered in a Short Message Server ("SMS") form. The actionable options may be displayed as buttons, links, or any other well-known user interface forms. The user may choose an action 529 by clicking on the corresponding button or link. An example actionable notification message 527 is provided below:

```
{
    "aps" : {
        "alert" : {
            "body" : "Bob wants to pay you money",
            "action-loc-key" : "ACCEPT"
        },
        "badge" : 1,
    },
    "paytoken" : "1234567890",
    "pay-confirm-url" : "http://www.v.me/pay/1234567890"
}
```

Alternatively, an exemplary notification message 527 may be substantially in the form of a HTTP(S) POST message including XML-formatted data, as provided below:

```
POST /actionablenotificationmessage.php HTTP/1.1
Host: www.ACNO.com
Content-Type: Application/XML
Content-Length: 667
<?XML version = "1.0" encoding = "UTF-8"?>
<actionable_notification_message>
    <timestamp>2010-05-08 05:00</timestamp>
    <actionable_notification_ID>459w456</actionable_notification_ID>
    <notification_destination_unique_id>SGS4453rp</notification_
destination_unique_id>
    <notification_message>Bank Over Draft Notice</notification_message>
    <action>1
      <action ID>sop3997</action_ID>
      <actionname>Authorize</action_name>
      <action_effect>send a message to ACNO to authorize the
draft</action_effect>
    </action>
    <action>2
      <action_ID>eow4697</action_ID>
      <action_name>Decline</action_name>
      <action_effect>send a message to ACNO to decline the draft
</action_effect>
    </action>
    <action>3
      <action_ID>oip3997</action_ID>
      <action_name>Send a notice</action_name>
    </action>
    <action>4
      <action_ID>iuz3331</action_ID>
      <action_name>allow pin verification</action_name>
      <action_effect>ask user for pin input</action_effect>
    </action>
    <notification_transmission_type>web</notification_transmission_type>
    <dialogue_box_position>
      <height>100</height>
      <width>300</width>
    </dialogue_box_position>
    <Alternative_notification_transmission_type>SMS<alternative_
notification_transmission_type>
</actionable_notification_message>
```

In this example, when the user 501 selects an action, the associated <action_ID> may be used to determine what corresponding action to perform. For example, the <action_ID> may identify an API call that would send an HTTP POST message (e.g., authorizing or declining authorization) back to the ACNO Server 503 or another server (e.g., Third Party Server 505). A different <action_ID> may cause the Client Device 502 to obtain the current GPS location and send that information to the ACNO Server 503. As yet another example, another <action_ID> may cause a verification app to be launched. The verification app may solicit from the user a PIN, finger print, photo, etc. to authenticate the user, and send the result of the verification back to the ACNO Server 503 or other servers.

If a user's action input 529 requires an action from another entity or component, the Client Device 502 may send an action request 531 to that entity/component. For example, the Client Device may send the action request 531 to the ACNO Server 503. An exemplary actionable request 531 substantially in the form of a HTTP(S) POST message including XML-formatted data, is provided below:

```
POST /actionrequest.php HTTP/1.1
Host: www.ACNO.com
Content-Type: Application/XML
Content-Length: 667
<?XML version = "1.0" encoding = "UTF-8"?>
<action_request>
    <timestamp>2010-05-08 06:00</timestamp>
    <actionable_notification_ID>459w456</actionable_notification_ID>
    <notification_destination_unique_id>SGS4453rp</notification_
destination_unique_id>
    <notification_message>10% off when using your Citibank credit card
before June 1 2010</notification_message>
    <action_ID>eow4697</action_ID>
    <action_name>save to couponbook</action_name>
</action_request>
```

Based on the action request 531, the ACNO Server 503 (or any other recipient configured to handle/process action requests, such as via an API) may effect the intended action 533 (i.e., perform the action). For example, the ACNO Server 503 may be asked to store a notification or coupon for later access or repeated delivery (e.g., if the user wishes to "snooze" a notification). The notification, the action, or other effects caused by the action may be stored 535 in a Notification Database 509.

Figure 6:
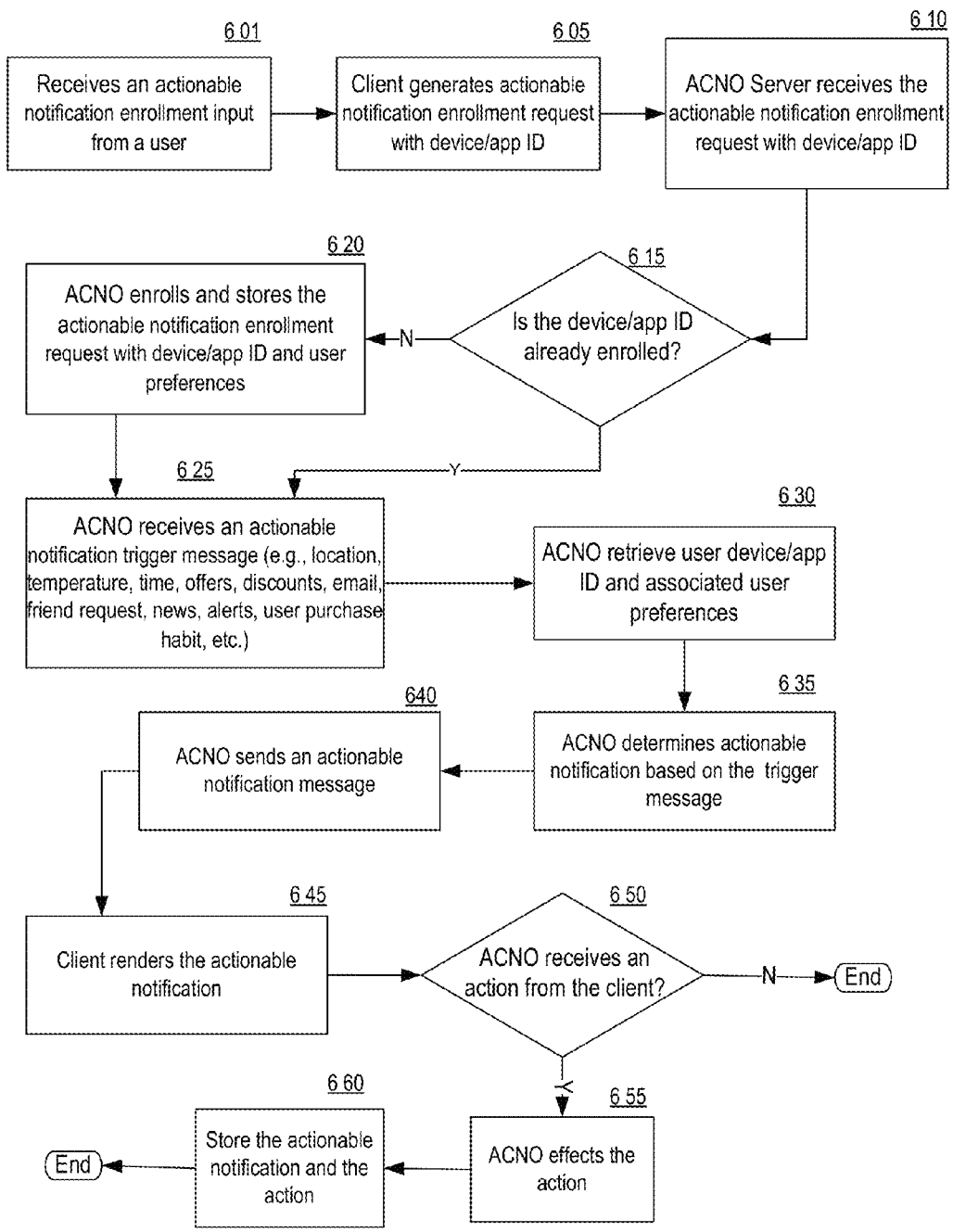
FIG. 6 shows a logic flow diagram illustrating example component in some embodiments of the actionable notification system.

FIG. 6 shows a logic flow diagram illustrating example component in some embodiments of the ACNO system. In one embodiment, the Client Device may receive an actionable notification enrollment input from a user 601. In response, the Client Device may generate an actionable notification enrollment request with device/app ID 605. The ACNO Server may receive the actionable notification enrollment request with the device/app ID 610, and determine whether the device/app ID is already enrolled 615. If the device/app ID is not already enrolled, the ACNO Server may enroll and store 620 the actionable notification enrollment request or selected data sent as part of the request (e.g., the device/app ID) in a database, as well as any user preference (e.g., notification rules, message size limit, etc.). If the device/app ID is already enrolled, the ACNO Server may check whether the existing user enrollment data (e.g., the device/app ID) ought to be updated. Otherwise, the enrollment request may be ignored.

The ACNO server may receive an actionable notification trigger message, such as location, temperature, time, user biometric information (e.g., heart rate), offers, discounts, email, friend request, news, alerts, user purchase habits, credit charge amount, and so forth 625. In some implementations, the trigger message may include identifications for identifying the intended recipient of the notification. Based on the identification, the ACNO Server may retrieve the user device/app ID and/or associated user preferences 630 from the database. Based on the trigger message (e.g., credit card charge amount, user's GPS location, or incoming email), the retrieved user preferences (e.g., notification rules), and/or other data (e.g., current system time), the ACNO Server may determine whether or not to generate an actionable notification, and if so, what it would include 635. The ACNO Server may then send the actionable notification message 640 to the Client Device based on, e.g., the user device/app ID. The Client Device may render an actionable notification user interface 645 in accordance with the actionable notification message from the ACNO Server. If the ACNO Server anticipates a response from the user, it may listen for an action response 650. If no action response is received (e.g., after a certain timeout period), the process ends. On the other hand, if an action response is received 655, then the ACNO Server may effect the action 655 and, depending on the notification and action, store relevant data in the database 660.

ACNO Controller

Figure 7:
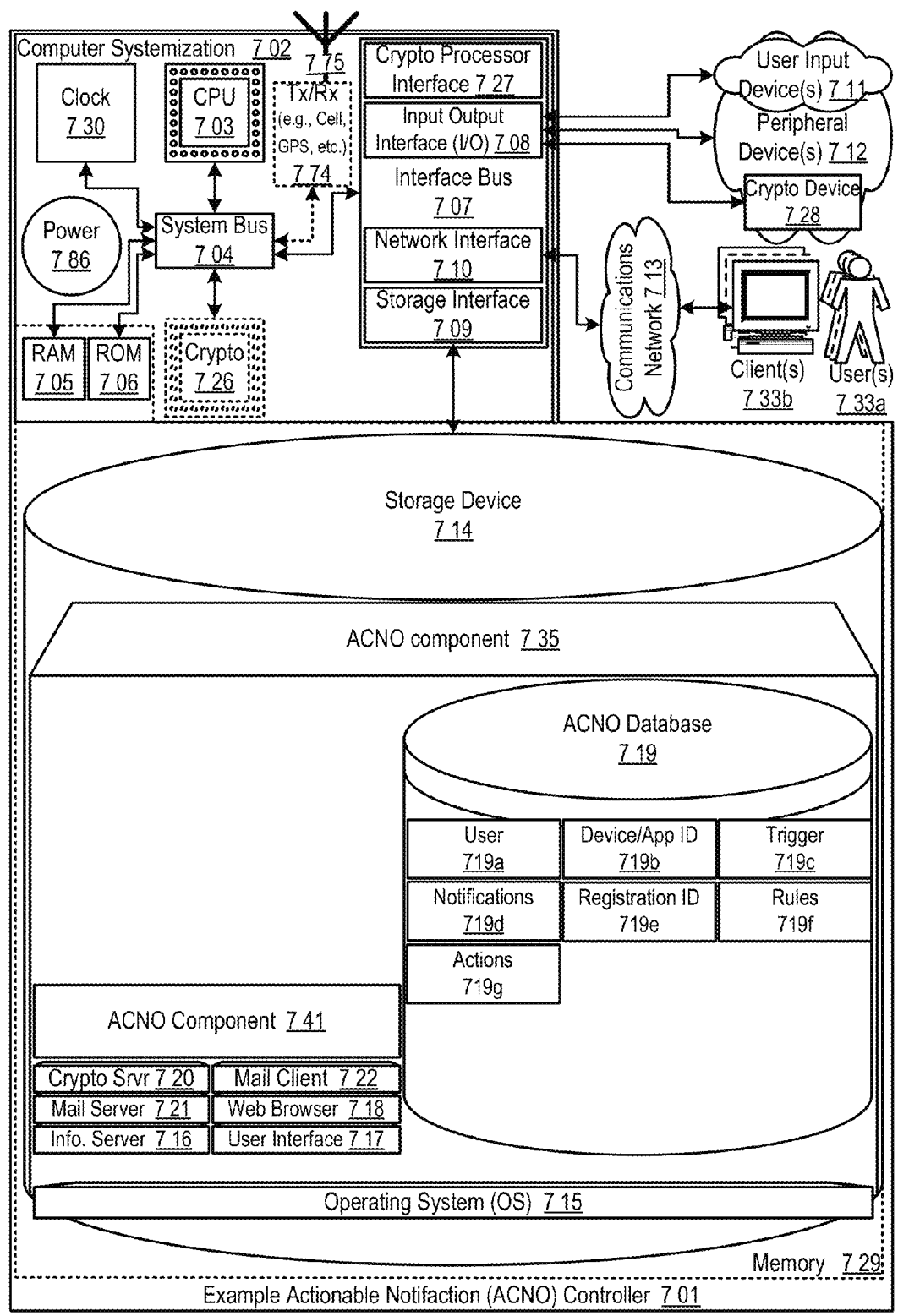
FIG. 7 shows a block diagram illustrating embodiments of an actionable notification system controller.

FIG. 7 shows a block diagram illustrating embodiments of a ACNO controller. In this embodiment, the ACNO controller 701 may serve to aggregate, process, store, search, serve, identify, instruct, generate, match, and/or facilitate interactions with a computer through various bi-directional linking technologies, and/or other related data.

Typically, users, which may be people and/or other systems, may engage information technology systems (e.g., computers) to facilitate information processing. In turn, computers employ processors to process information; such processors 703 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 729 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the ACNO controller 701 may be connected to and/or communicate with entities such as, but not limited to: one or more users from user input devices 711; peripheral devices 712; an optional cryptographic processor device 728; and/or a communications network 713.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The ACNO controller 701 may be based on computer systems that may comprise, but are not limited to, components such as: a computer systemization 702 connected to memory 729.

Computer Systemization

A computer systemization 702 may comprise a clock 730, central processing unit ("CPU(s)" and/or "processor(s)" (these terms are used interchangeable throughout the disclosure unless noted to the contrary)) 703, a memory 729 (e.g., a read only memory (ROM) 706, a random access memory (RAM) 705, etc.), and/or an interface bus 707, and most frequently, although not necessarily, are all interconnected and/or communicating through a system bus 704 on one or more (mother)board(s) 702 having conductive and/or otherwise transportive circuit pathways through which instructions (e.g., binary encoded signals) may travel to effectuate communications, operations, storage, etc. The computer systemization may be connected to a power source 786; e.g., optionally the power source may be internal. Optionally, a cryptographic processor 726 and/or transceivers (e.g., ICs) 774 may be connected to the system bus. In another embodiment, the cryptographic processor and/or transceivers may be connected as either internal and/or external peripheral devices 712 via the interface bus I/O. In turn, the transceivers may be connected to antenna(s) 775, thereby effectuating wireless transmission and reception of various communication and/or sensor protocols; for example the antenna(s) may connect to: a Texas Instruments WiLink WL1283 transceiver chip (e.g., providing 802.11n, Bluetooth 3.0, FM, global positioning system (GPS) (thereby allowing ACNO controller to determine its location)); Broadcom BCM4329FKUBG transceiver chip (e.g., providing 802.11n, Bluetooth 2.1+EDR, FM, etc.); a Broadcom BCM4750IUB8 receiver chip (e.g., GPS); an Infineon Technologies X-Gold 618-PMB9800 (e.g., providing 2G/3G HSDPA/HSUPA communications); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 729 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the ACNO controller and beyond through various interfaces. Should processing requirements dictate a greater amount speed and/or capacity, distributed processors (e.g., Distributed ACNO), mainframe, multi-core, parallel, and/or supercomputer architectures may similarly be employed. Alternatively, should deployment requirements dictate greater portability, smaller Personal Digital Assistants (PDAs) may be employed.

Depending on the particular implementation, features of the ACNO may be achieved by implementing a microcontroller such as CAST's R8051XC2 microcontroller; Intel's MCS 51 (i.e., 8051 microcontroller); and/or the like. Also, to implement certain features of the ACNO, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the ACNO component collection (distributed or otherwise) and/or features may be implemented via the microprocessor and/or via embedded components; e.g., via ASIC, coprocessor, DSP, FPGA, and/or the like. Alternately, some implementations of the ACNO may be implemented with embedded components that are configured and used to achieve a variety of features or signal processing.

Depending on the particular implementation, the embedded components may include software solutions, hardware solutions, and/or some combination of both hardware/software solutions. For example, ACNO features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the ACNO features. A hierarchy of programmable interconnects allow logic blocks to be interconnected as needed by the ACNO system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the ACNO may be developed on regular FPGAs and then migrated into a fixed version that more resembles ASIC implementations. Alternate or coordinating implementations may migrate ACNO controller features to a final ASIC instead of or in addition to FPGAs. Depending on the implementation all of the aforementioned embedded components and microprocessors may be considered the "CPU" and/or "processor" for the ACNO.

Power Source

The power source 786 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 786 is connected to at least one of the interconnected subsequent components of the ACNO thereby providing an electric current to all subsequent components. In one example, the power source 786 is connected to the system bus component 704. In an alternative embodiment, an outside power source 786 is provided through a connection across the I/O 708 interface. For example, a USB and/or IEEE 1394 connection carries both data and power across the connection and is therefore a suitable source of power.

Interface Adapters

Interface bus(ses) 707 may accept, connect, and/or communicate to a number of interface adapters, conventionally although not necessarily in the form of adapter cards, such as but not limited to: input output interfaces (I/O) 708, storage interfaces 709, network interfaces 710, and/or the like. Optionally, cryptographic processor interfaces 727 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 709 may accept, communicate, and/or connect to a number of storage devices such as, but not limited to: storage devices 714, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 710 may accept, communicate, and/or connect to a communications network 713. Through a communications network 713, the ACNO controller is accessible through remote clients 733b (e.g., computers with web browsers) by users 733a. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed ACNO), architectures may similarly be employed to pool, load balance, and/or otherwise increase the communicative bandwidth required by the ACNO controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 410 may be used to engage with various communications network types 413. For example, multiple network interfaces may be employed to allow for the communication over broadcast, multicast, and/or unicast networks.

Input Output interfaces (I/O) 708 may accept, communicate, and/or connect to user input devices 711, peripheral devices 712, cryptographic processor devices 728, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 711 often are a type of peripheral device 712 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 712 may be connected and/or communicate to I/O and/or other facilities of the like such as network interfaces, storage interfaces, directly to the interface bus, system bus, the CPU, and/or the like. Peripheral devices may be external, internal and/or part of the ACNO controller. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices 728), force-feedback devices (e.g., vibrating motors), network interfaces, printers, scanners, storage devices, transceivers (e.g., cellular, GPS, etc.), video devices (e.g., goggles, monitors, etc.), video sources, visors, and/or the like. Peripheral devices often include types of input devices (e.g., cameras).

It should be noted that although user input devices and peripheral devices may be employed, the ACNO controller may be embodied as an embedded, dedicated, and/or monitor-less (i.e., headless) device, wherein access would be provided over a network interface connection.

Cryptographic units such as, but not limited to, microcontrollers, processors 726, interfaces 727, and/or devices 728 may be attached, and/or communicate with the ACNO controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: Broadcom's CryptoNetX and other Security Processors; nCipher's nShield; SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+ MB/s of cryptographic instructions; VLSI Technology's 33 MHz 6868; and/or the like.

Memory

Generally, any mechanization and/or embodiment allowing a processor to affect the storage and/or retrieval of information is regarded as memory 729. However, memory is a fungible technology and resource, thus, any number of memory embodiments may be employed in lieu of or in concert with one another. It is to be understood that the ACNO controller and/or a computer systemization may employ various forms of memory 729. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory 729 will include ROM 406, RAM 405, and a storage device 714. A storage device 714 may be any conventional computer system storage. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 729 may contain a collection of program and/or database components and/or data such as, but not limited to: operating system component(s) 715 (operating system); information server component(s) 716 (information server); user interface component(s) 717 (user interface); Web browser component(s) 718 (Web browser); database(s) 719; mail server component(s) 721; mail client component(s) 722; cryptographic server component(s) 720 (cryptographic server); the ACNO component(s) 735; (i.e., collectively a component collection). These components may be stored and accessed from the storage devices and/or from storage devices accessible through an interface bus. Although non-conventional program components such as those in the component collection, typically, are stored in a local storage device 714, they may also be loaded and/or stored in memory such as: peripheral devices, RAM, remote storage facilities through a communications network, ROM, various forms of memory, and/or the like.

Operating System

The operating system component 715 is an executable program component facilitating the operation of the ACNO controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Nan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the ACNO controller to communicate with other entities through a communications network 713. Various communication protocols may be used by the ACNO controller as a subcarrier transport mechanism for interaction, such as, but not limited to: multicast, TCP/IP, UDP, unicast, and/or the like.

Information Server

An information server component 416 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective–) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the ACNO controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the ACNO database 419, operating systems, other program components, user interfaces, Web browsers, and/or the like.

Access to the ACNO database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the ACNO. In one embodiment, the information server would provide a Web form accessible by a Web browser.

Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the ACNO as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 717 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 718 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the ACNO enabled nodes. The combined application may be nugatory on systems employing standard Web browsers.

Mail Server

A mail server component 721 is a stored program component that is executed by a CPU 703. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the ACNO.

Access to the ACNO mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 722 is a stored program component that is executed by a CPU 703. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 720 is a stored program component that is executed by a CPU 703, cryptographic processor 726, cryptographic processor interface 727, cryptographic processor device 728, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the ACNO may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the ACNO component to engage in secure transactions if so desired. The cryptographic component facilitates the secure accessing of resources on the ACNO and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The ACNO Database

The ACNO database component 719 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the ACNO database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the ACNO database is implemented as a data-structure, the use of the ACNO database 719 may be integrated into another component such as the ACNO component 735. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 719 includes several tables 719a-g. A user table 719a may include fields such as, but not limited to: a user_ID, name, home_address, work_address, telephone_number, email, merchant_ID client_id, account_id, device_id, app_id, notification_destination_unique_id, notification_id, user_account_number, user_preferences, and/or the like. The user table may support and/or track multiple entity accounts on a ACNO. A Device/App ID table 719b may include fields such as, but not limited to: user_id, device_id, app_id, notification_destination_unique_id, device_name, device_operating_system, app_name, and/or the like. A Trigger table 719c may include fields such as, but not limited to: trigger_id, trigger_source_id, user_id, trigger_type, trigger_message, and/or the like. A Notification Table 719d may include fields such as, but not limited to: notification_id, notification_message, user_id, notification_destination_unique_id, action_id, action_link, action_name, notification_transmission_type, notification_position, notification_category, and/or the like. A Registration ID table 719e may include fields such as, but not limited to: registration_id, user_id, device_id, app_id, and/or the like. A Rules table 719f may include fields such as, but not limited to: rule_id, user_id, default_text, rule_test1, rule_test2, actionable options, and/or the like. The Actions table 719g may include fields such as, but not limited to: action_id, action_definition, action_function_id, action_parameters, and/or the like.

In one embodiment, the ACNO database may interact with other database systems. For example, employing a distributed database system, queries and data access by search ACNO component may treat the combination of the ACNO database, an integrated data security layer database as a single database entity.

In one embodiment, user programs may contain various user interface primitives, which may serve to update the ACNO. Also, various accounts may require custom database tables depending upon the environments and the types of clients the ACNO may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 719*a*-*g*. The ACNO may be configured to keep track of various settings, inputs, and parameters via database controllers.

The ACNO database may communicate to and/or with other components in a component collection, including itself, and/or facilities of the like. Most frequently, the ACNO database communicates with the ACNO component, other program components, and/or the like. The database may contain, retain, and provide information regarding other nodes and data.

The ACNOs

The ACNO component 735 is a stored program component that is executed by a CPU. In one embodiment, the ACNO component incorporates any and/or all combinations of the aspects of the ACNO that was discussed in the previous figures. As such, the ACNO affects accessing, obtaining and the provision of information, services, transactions, and/or the like across various communications networks.

The ACNO transforms inputs such as actionable notification enrollment input (e.g., 211), action input (e.g., 229), trigger messages (e.g., 519, 521, 523) via ACNO components 741, into actionable notification message outputs (e.g., 527).

The ACNO component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the ACNO server employs a cryptographic server to encrypt and decrypt communications. The ACNO component may communicate to and/or with other components in a component collection, including itself, and/or facilities of the like. Most frequently, the ACNO component communicates with the ACNO database, operating systems, other program components, and/or the like. The ACNO may contain, communicate, generate, obtain, and/or provide program component, system, user, and/or data communications, requests, and/or responses.

Distributed ACNOs

The structure and/or operation of any of the ACNO node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the ACNO controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the ACNO controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
// set ip address and port to listen to for incoming data
$address = '192.168.0.100';
$port = 255;
// create a server-side SSL socket, listen for/accept incoming communication
$sock = socket_create(AF_INET, SOCK_STREAM, 0);
socket_bind($sock, $address, $port) or die('Could not bind to address');
socket_listen($sock);
$client = socket_accept($sock);
// read input data from client device in 1024 byte blocks until end of message
do {
    $input = " ";
    $input = socket_read($client, 1024);
    $data .= $input;
} while($input != " ");
// parse data to extract variables
$obj = json_decode($data, true);
// store input data in a database
mysql_connect("201.408.185.132",$DBserver,$password); // access database server
mysql_select("CLIENT_DB.SQL"); // select database to append
mysql_query("INSERT INTO UserTable (transmission)
VALUES ($data)"); // add data to UserTable table in a CLIENT database
mysql_close("CLIENT_DB.SQL"); // close connection to database
?>
```

Also, the following resources may be used to provide example embodiments regarding SOAP parser implementation:

http://www.xav.com/perl/site/lib/SOAP/Parser.html
http://publib.boulder.ibm.com/infocenter/tivihelp/v2r1/index.jsp?topic=/com.ibm.IBMDI.doc/referenceguide295.htm and other parser implementations:

http://publib.boulder.ibm.com/infocenter/tivihelp/v2r1/index.jsp?topic=/com.ibm.IBMDI.doc/referenceguide259.htm all of which are hereby expressly incorporated by reference.

In order to address various issues and advance the art, the entirety of this application for ACTIONABLE NOTIFICATIONS APPARATUSES, METHODS AND SYSTEMS (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a ACNO individual and/or enterprise user, database configuration and/or relational model, data type, data transmission and/or network framework, syntax structure, and/or the like, various embodiments of the ACNO, may be implemented that enable a great deal of flexibility and customization. For example, aspects of the ACNO may be adapted for system optimization. While various embodiments and discussions of the ACNO have been directed to actionable notifications, however, it is to be understood that the embodiments described herein may be readily configured and/or customized for a wide variety of other applications and/or implementations.

What is claimed is:

1. A processor-implemented method for generating actionable push notifications, comprising:
    receiving, by a notification server, a trigger message from a third party server;
    determining, by the notification server, user information associated with a user in response to the trigger message from the third party server;
    evaluating, by the notification server, the user information to determine one or more notification rules defined by the user, wherein the one or more notification rules indicate one or more circumstances under which the user should receive actionable notification messages;
    based on the trigger message and the one or more notification rules defined by the user, determining, by the notification server, that an actionable notification message should be sent to the user;
    based on the user information, determining, by the notification server, a user device associated with the user;
    in response to the determination that the actionable notification message should be sent to the user, generating, by the notification server, the actionable notification message having one or more actionable options operatively related to the actionable notification message; and
    transmitting, by the notification server, the actionable notification message and the one or more associated actionable options to the user device associated with the user,
    wherein the actionable notification message causes the user device to display a graphical user interface including a notification message corresponding to the actionable notification message and one or more user interface components corresponding to the one or more actionable options.

2. The processor-implemented method of claim 1, further comprising:
    receiving, by the notification server, an enrollment request associated with the user, wherein the enrollment request includes the user information; and
    storing, by the notification server, the user information.

3. The processor-implemented method of claim 2, further comprising:
    assigning, by the notification server, a registration ID in response to the received enrollment request, wherein the registration ID is associated with the user;
    storing, by the notification server, the registration ID; and
    transmitting, by the notification server, the registration ID to the user device.

4. The processor-implemented method of claim 3, wherein the trigger message includes the registration ID, and wherein the step of determining user information is based at least on the registration ID included in the trigger message.

5. The processor-implemented method of claim 1, wherein the user information includes at least one of: a user ID, a device ID, and an app ID.

6. The processor-implemented method of claim 1, wherein the trigger message includes information associated with at least one of: a location of the user device, time, temperature, and biometric measurements of the user.

7. The processor-implemented method of claim 1, wherein the third party server is a remote server.

8. The processor-implemented method of claim 7, wherein the trigger message includes at least one of: an offer, a discount, an email, a friend request, news, an alert, and credit charge amount.

9. The processor-implemented method of claim 1, wherein the third party server includes a database associated with the notification server.

10. The processor-implemented method of claim 9, wherein the trigger message includes information associated with the user's purchase history or purchase habits.

11. The processor-implemented method of claim 1, further comprising:
   determining, by the notification server, the one or more actionable options to include in the actionable notification message based on one or more notification rules defined by the user.

12. The processor-implemented method of claim 1, further comprising:
   receiving, by the notification server, an action request from the user device, wherein the action request corresponds to one of the one or more actionable options selected by the user; and
   performing, by the notification server, operations in accordance with the action request.

13. The processor-implemented method of claim 1, wherein a user selection of one of the one or more user interface components corresponding to the one or more actionable options causes a corresponding action request to be processed by the user device.

14. The processor-implemented method of claim 1, wherein the user device includes an app associated with the third party server.

15. The processor-implemented method of claim 14, wherein a user selection of one of the one or more user interface components corresponding to the one or more actionable options causes a corresponding action request to be processed by the third party server.

16. The processor-implemented method of claim 14, wherein a user selection of one of the one or more user interface components corresponding to the one or more actionable options causes a corresponding action request to be processed by the app.

17. The processor-implemented method of claim 14, wherein a user selection of one of the one or more user interface components corresponding to the one or more actionable options causes a corresponding action request to be processed by a second app on the user device.

18. The processor-implemented method of claim 1, wherein the actionable notification message is configured to be processed by an actionable notification handler on the user device.

19. A non-transitory computer-readable medium encoded with instructions for causing a processing system to execute steps for generating actionable push notifications, comprising:
   receiving, by a notification server, a trigger message from a third party server;
   determining, by the notification server, user information associated with a user in response to the trigger message from the third party server;
   evaluating, by the notification server, the user information to determine one or more notification rules defined by the user, wherein the one or more notification rules indicate one or more circumstances under which the user should receive actionable notification messages;
   based on the trigger message and the one or more notification rules defined by the user, determining, by the notification server, that an actionable notification message should be sent to the user;
   based on the user information, determining, by the notification server, a user device associated with the user;
   in response to the determination that the actionable notification message should be sent to the user, generating, by the notification server, the actionable notification message having one or more actionable options operatively related to the actionable notification message; and
   transmitting, by the notification server, the actionable notification message and the one or more associated actionable options to the user device associated with the user,
   wherein the actionable notification message causes the user device to display a graphical user interface including a notification message corresponding to the actionable notification message and one or more user interface components corresponding to the one or more actionable options.

20. The non-transitory computer-readable medium of claim 19, further comprising instructions for causing the processing system to execute steps, including:
   receiving, by the notification server, an enrollment request associated with the user, wherein the enrollment request includes the user information; and
   storing, by the notification server, the user information.

21. The non-transitory computer-readable medium of claim 20, further comprising instructions for causing the processing system to execute steps, including:
   assigning, by the notification server, a registration ID in response to the received enrollment request, wherein the registration ID is associated with the user;
   storing, by the notification server, the registration ID; and
   transmitting, by the notification server, the registration ID to the user device.

22. The non-transitory computer-readable medium of claim 21, wherein the trigger message includes the registration ID, and wherein the step of determining user information is based at least on the registration ID included in the trigger message.

23. The non-transitory computer-readable medium of claim 19, wherein the user information includes at least one of: a user ID, a device ID, and an app ID.

24. The non-transitory computer-readable medium of claim 19, wherein the trigger message includes information associated with at least one of: a location of the user device, time, temperature, and biometric measurements of the user.

25. The non-transitory computer-readable medium of claim 19, wherein the third party server is a remote server.

26. The non-transitory computer-readable medium of claim 25, wherein the trigger message includes at least one of: an offer, a discount, an email, a friend request, news, an alert, and credit charge amount.

27. The non-transitory computer-readable medium of claim 19, wherein the third party server includes a database associated with the notification server.

28. The non-transitory computer-readable medium of claim 27, wherein the trigger message includes information associated with the user's purchase history or purchase habits.

29. The non-transitory computer-readable medium of claim 19, further comprising instructions for causing the processing system to execute steps, including:

determining, by the notification server, whether to generate the actionable notification message based on one or more notification rules defined by the user.

30. The non-transitory computer-readable medium of claim 19, further comprising instructions for causing the processing system to execute steps, including:
receiving, by the notification server, an action request from the user device, wherein the action request corresponds to one of the one or more actionable options selected by the user; and
performing, by the notification server, operations in accordance with the action request.

31. The non-transitory computer-readable medium of claim 19, wherein a user selection of one of the one or more user interface components corresponding to the one or more actionable options causes a corresponding action request to be processed by the user device.

32. The non-transitory computer-readable medium of claim 19, wherein the user device includes an app associated with the third party server.

33. The non-transitory computer-readable medium of claim 32, wherein a user selection of one of the one or more user interface components corresponding to the one or more actionable options causes a corresponding action request to be processed by the third party server.

34. The non-transitory computer-readable medium of claim 32, wherein a user selection of one of the one or more user interface components corresponding to the one or more actionable options causes a corresponding action request to be processed by the app.

35. The non-transitory computer-readable medium of claim 32 wherein a user selection of one of the one or more user interface components corresponding to the one or more actionable options causes a corresponding action request to be processed by a second app on the user device.

36. The non-transitory computer-readable medium of claim 19, wherein the actionable notification message is configured to be processed by an actionable notification handler on the user device.

37. A system for generating actionable push notifications, comprising:
a processing system; and
a memory coupled to the processing system, wherein the processing system is configured to execute steps, comprising:
receiving, by a notification server, a trigger message from a third party server;
determining, by the notification server, user information associated with a user in response to the trigger message from the third party server;
evaluating, by the notification server, the user information to determine one or more notification rules defined by the user, wherein the one or more notification rules indicate one or more circumstances under which the user should receive actionable notification messages;
based on the trigger message and the one or more notification rules defined by the user, determining, by the notification server, that an actionable notification message should be sent to the user based on one or more notification rules defined by the user;
based on the user information, determining, by the notification server, a user device associated with the user;
in response to the determination that the actionable notification message should be sent to the user, generating, by the notification server, the actionable notification message having one or more actionable options operatively related to the actionable notification message; and
transmitting, by the notification server, the actionable notification message and the one or more associated actionable options to the user device associated with the user,
wherein the actionable notification message causes the user device to display a graphical user interface including a notification message corresponding to the actionable notification message and one or more user interface components corresponding to the one or more actionable options.

38. The system of claim 37, wherein the processing system is configured to execute further steps, including:
receiving, by the notification server, an enrollment request associated with the user, wherein the enrollment request includes the user information; and
storing, by the notification server, the user information.

39. The system of claim 38, wherein the processing system is configured to execute further steps, including:
assigning, by the notification server, a registration ID in response to the received enrollment request, wherein the registration ID is associated with the user;
storing, by the notification server, the registration ID; and
transmitting, by the notification server, the registration ID to the user device.

40. The system of claim 39, wherein the trigger message includes the registration ID, and wherein the step of determining user information is based at least on the registration ID included in the trigger message.

41. The system of claim 37, wherein the user information includes at least one of: a user ID, a device ID, and an app ID.

42. The system of claim 37, wherein the trigger message includes information associated with at least one of: a location of the user device, time, temperature, and biometric measurements of the user.

43. The system of claim 37, wherein the third party server is remote server.

44. The system of claim 43, wherein the trigger message includes at least one of: an offer, a discount, an email, a friend request, news, an alert, and credit charge amount.

45. The system of claim 37, wherein the third party server includes a database associated with the notification server.

46. The system of claim 45, wherein the trigger message includes information associated with the user's purchase history or purchase habits.

47. The system of claim 37, further comprising:
determining, by the notification server, whether to generate the actionable notification message based on one or more notification rules defined by the user.

48. The system of claim 37, wherein the processing system is configured to execute further steps, including:
receiving, by the notification server, an action request from the user device, wherein the action request corresponds to one of the one or more actionable options selected by the user; and
performing, by the notification server, operations in accordance with the action request.

49. The system of claim 37, wherein a user selection of one of the one or more user interface components corresponding to the one or more actionable options causes a corresponding action request to be processed by the user device.

50. The system of claim 37, wherein the user device includes an app associated with the third party server.

51. The system of claim 50, wherein a user selection of one of the one or more user interface components corresponding to the one or more actionable options causes a corresponding action request to be processed by the third party server.

52. The system of claim 50, wherein a user selection of one of the one or more user interface components corresponding to the one or more actionable options causes a corresponding action request to be processed by the app.

53. The system of claim 50, wherein a user selection of one of the one or more user interface components corresponding to the one or more actionable options causes a corresponding action request to be processed by a second app on the user device.

54. The system of claim 37, wherein the actionable notification message is configured to be processed by an actionable notification handler on the user device.

* * * * *